Patented Nov. 13, 1945

2,389,088

UNITED STATES PATENT OFFICE 2,389,088

PRODUCTION OF CHLORINATED CARBOCYCLIC CARBOXYLIC ACIDS

Frederick C. Schubart, Cleveland, Ohio, assignor to American Cyanamid Company, New York, N. Y., a corporation of Maine No Drawing. Application August 22, 1942, Serial No. 455,800

2 Claims. (Cl. 260—515)

This invention relates to a method for the production of chlorinated carbocyclic carboxylic acids such as phthalic acid, benzoic acid, naphthoic acid, terephthalic acid, abietic acid and the like, and particularly to the production of 4-chlorophthalic acid in the form of its alkali metal salt.

Heretofore the chlorination of carbocyclic carboxylic acids has been carried out in the presence of free caustic soda or other alkali, so that sodium hypochlorite has been the active chlorinating agent. This method has required an excess both of alkali and of chlorine over that theoretically necessary for the chlorination. It is a principal object of the present invention to provide an efficient method for the chlorination of carbocyclic carboxylic acids in which no excess alkali is necessary, and in which substantial savings of chlorine are effected.

I have discovered that excellent yields on the order of 70–75% of theory of monochlorphthalic acid, monochlorbenzoic acid, monochlornaphthoic acid, monochlorabietic acid and other chlorinated carboxylic acids can be obtained by using no alkali in excess over that required for the formation of the neutral salt of the carboxylic acid concerned, thus carrying out the chlorination at a pH range far more to the acid side than in the method heretofore employed. The process of my present invention therefore consists essentially in chlorinating unsaturated carbocyclic carboxylic acids, such as those listed above, under conditions such that free hypochlorous acid is most probably the chlorinating agent instead of the sodium hypochlorite heretofore used.

In practicing the process of my invention I first prepare a water solution of a neutral, water-soluble salt of the desired carbocyclic carboxylic acid or acid mixtures such as, for example, the neutral alkali metal salt. Chlorine is slowly passed into this water solution at relatively low temperatures until no more chlorine is absorbed. A solid alkali metal chloride such as sodium chloride is then added to the batch with continued agitation, and the resulting precipitate of chlorinated acid or water-soluble salt thereof is recovered by filtration.

In carrying out the above chlorination process on a commercial scale a considerable improvement in yield is obtained when the chlorination, addition of sodium chloride and filtering off of the product is carried out in successive alternating steps, reusing the mother liquor from the filtration for dissolving further amounts of the carboxylic acid salt to which, in turn, further amounts of chlorine are then added. In the manufacture of 4-chlorophthalic acid by this method I have effected a saving of about 72% of the amount of chlorine that would be needed if the chlorination had been carried out in the presence of free alkali.

While I do not wish to be bound to any particular theory as to the mechanism of the reaction I nevertheless believe that the presence of free hypochlorous acid in any amount, and of an electrolyte such as an alkali metal chloride, are essential factors in bringing about the chlorination of the carbocyclic acid nucleus in appreciable amounts, and to produce the precipitation of the salt of the newly formed chlorine substituted acid. This conception is based on my discovery that in the course of the chlorination according to the method using excess alkali the formation of the chloro-acid as indicated by a sudden exothermic effect which begins exactly at the moment when the chlorine input exceeds the amount necessary to convert the free alkali into hypochlorite, that is at a pH range at which the presence of free hypochlorous acid is to be assumed. Furthermore, I have observed that neither hypochlorites nor free hypochlorous acids alone allow a substantial formation and precipitation of chlorinated product, unless there is present an electrolyte such as an alkali metal chloride able to precipitate the chlorinated product by salting it out, thereby removing it from the liquid phase equilibrium. I, therefore, presume that free hypochlorous acid is the chlorinating agent and that, for reasons of equilibrium and mass reaction, the chlorinated product must be eliminated from the liquid phase by salting it out, in order to make the chlorination proceed.

The invention will be illustrated in detail by the following specific example. It should be understood, however, that benzoic acid, naphthoic acid, terephthalic or other isomeric phthalic acids or any other carbocyclic carboxylic acid can be substituted for the o-phthalic acid employed in this example with similar results.

Example

Disodium phthalate was dissolved in water to make a 6% solution, which was cooled to 10–15° C. Chlorine was slowly added to the solution at these temperatures until the solution was saturated. Solid sodium chloride was then added to the batch with continued agitation.

As the suspension of sodium chloride dissolved, a precipitation of acid sodium 4-chlorophthalate appeared, which was filtered off. Additional amounts of disodium phthalate were then added to the solution, more chlorine was introduced, and sodium chloride was again added to separate out further batches of acid sodium chlorophthalate.

When a 6% disodium phthalate solution is used the final concentration of sodium chloride is usually about 9–10% of the water present, and a 71% yield of acid sodium 4-chlorophthalate is obtained, on the basis of the disodium phthalate originally used. 90% of the chlorine added is combined in the final product, which is an extremely efficient utilization of the chlorine added.

What I claim is:

1. A method of producing chlorinated aromatic carboxylic acids which comprises introducing chlorine into a non-alkaline water solution of a neutral alkali metal salt of an aromatic carboxylic acid, adding a solid alkali metal chloride, and filtering off the chlorinated product.

2. A method of producing 4-chlorophthalic acid which comprises introducing chlorine into a non-alkaline water solution of a neutral alkali metal salt of phthalic acid, adding a solid alkali metal chloride, and filtering off the resulting precipitate of acid sodium 4-chlorophthalate.

FREDERICK C. SCHUBART.